DIODE MATRIX FOR DECODING PULSE SIGNALS

Filed June 14, 1961 7 Sheets-Sheet 1

INVENTOR.
ROBERT STEENECK

BY Eli Weiss

ATTORNEY

DIODE MATRIX FOR DECODING PULSE SIGNALS

Filed June 14, 1961 7 Sheets-Sheet 2

INVENTOR.
ROBERT STEENECK

BY

Eli Weiss

ATTORNEY

INVENTOR.
ROBERT STEENECK

BY Eli Weiss

ATTORNEY

Dec. 21, 1965 R. STEENECK 3,225,331

DIODE MATRIX FOR DECODING PULSE SIGNALS

Filed June 14, 1961 7 Sheets-Sheet 4

INVENTOR.
ROBERT STEENECK

BY El Weiss

ATTORNEY

INVENTOR.
ROBERT STEENECK

BY Eli Weiss

ATTORNEY

DIODE MATRIX FOR DECODING PULSE SIGNALS

INVENTOR.
ROBERT STEENECK

BY Eli Weiss

ATTORNEY

INVENTOR.
ROBERT STEENECK

BY

Eli Weiss

ATTORNEY

United States Patent Office 3,225,331

Patented Dec. 21, 1965

3,225,331
DIODE MATRIX FOR DECODING PULSE SIGNALS

Robert Steeneck, New York, N.Y., assignor to The Western Union Telegraph Company, New York, N.Y., a corporation of New York Filed June 14, 1961, Ser. No. 117,113
7 Claims. (Cl. 340—166)

This invention relates generally to a mixing module matrix and more particularly to a network of unidirectional conductive devices arranged to decode received code pulse signals.

It is a primary object of this invention to provide a device which utilizes a minimum number of unidirectional conductive devices to decode received code pulse signals.

It is another object of this invention to provide a mixing module matrix which can be preassembled into plug-in units to permit rapid replacement of defective components and to facilitate the assemblage of networks selectively adaptable to accommodate preselected input code pulse signals.

It is still another object of this invention to provide a mixing module matrix which presents a minimum number of possible error causing electrical paths.

Figure 1:
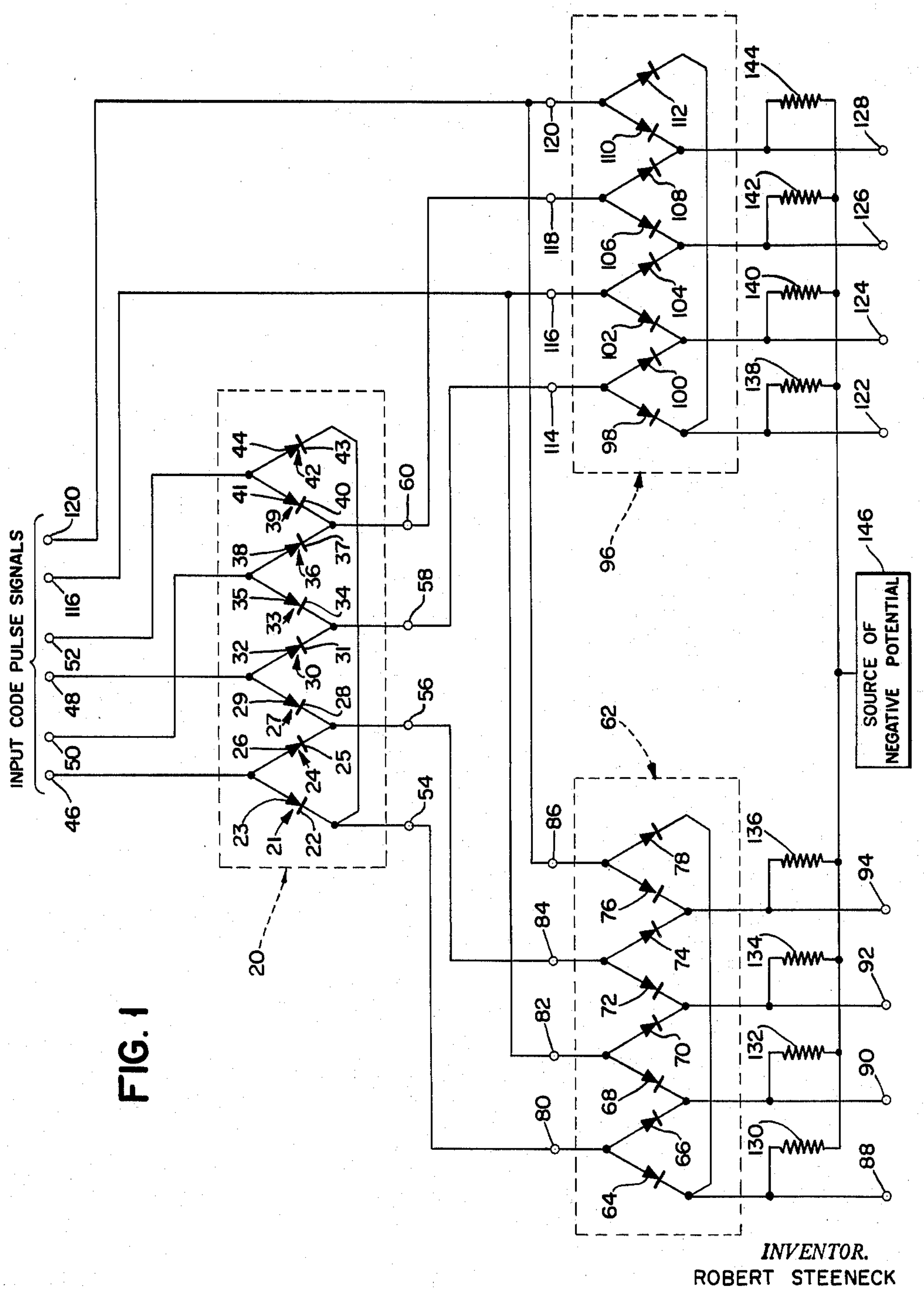
Figures 2, 8:
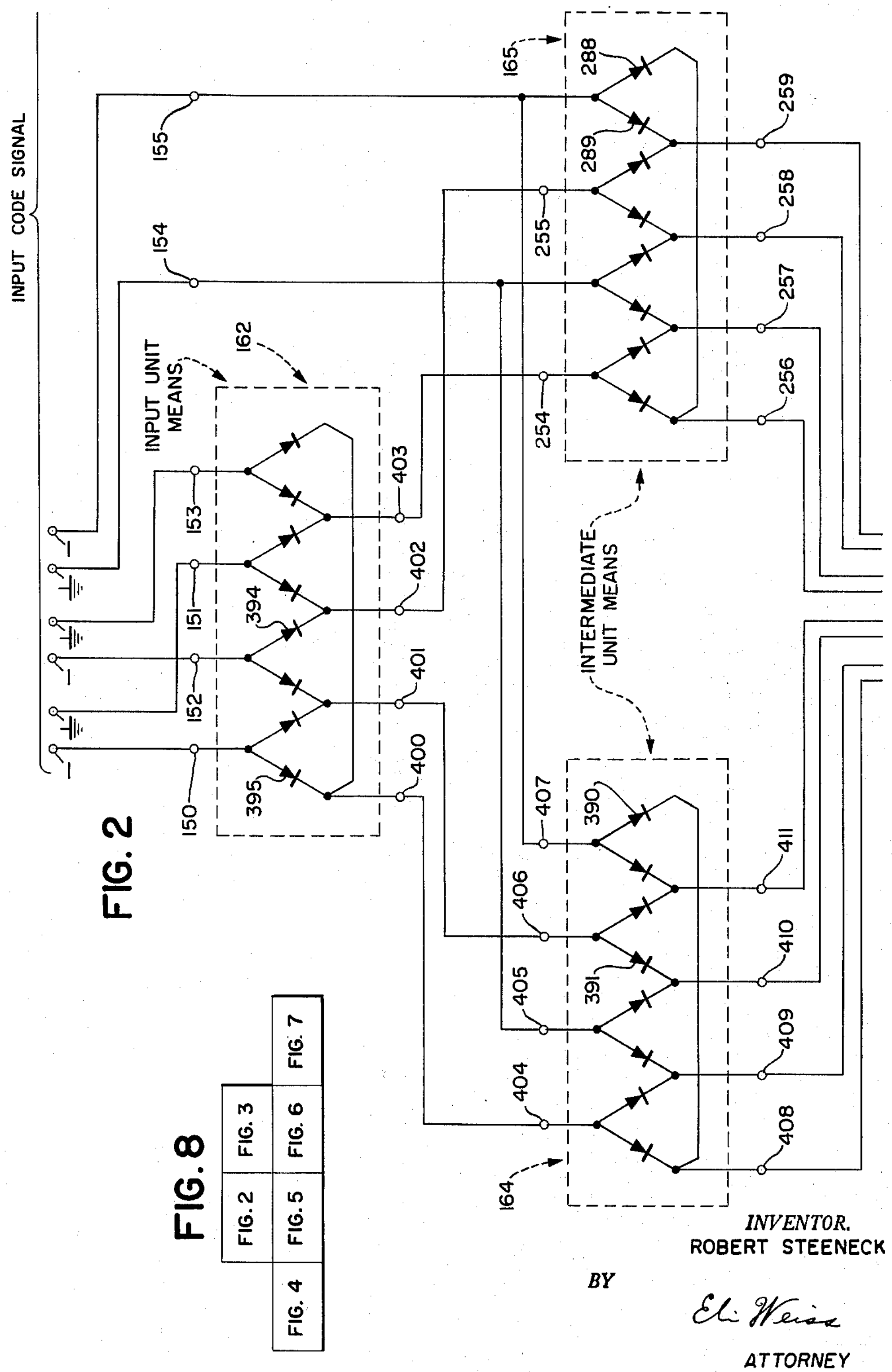
Figure 3:
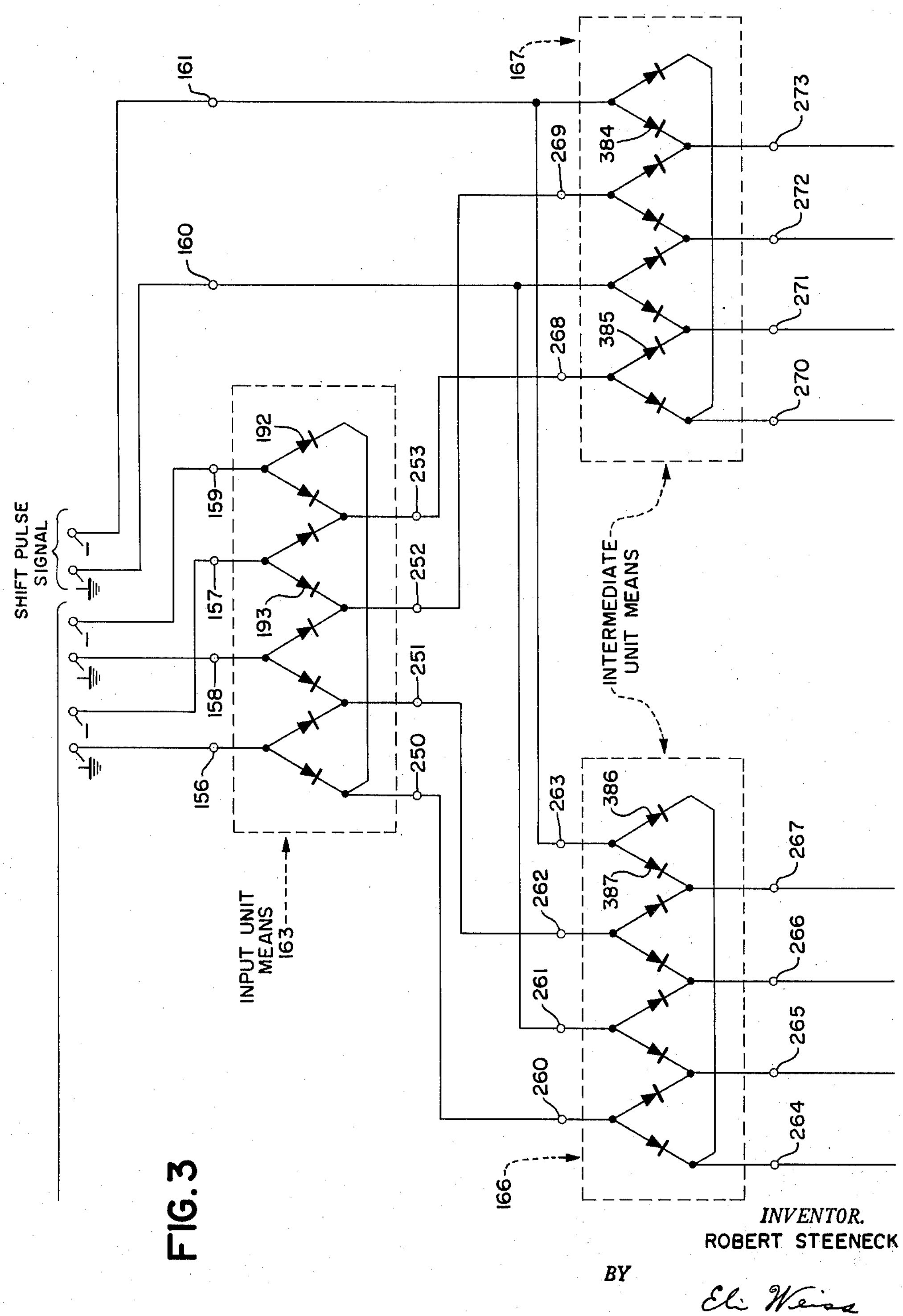
Figure 4:
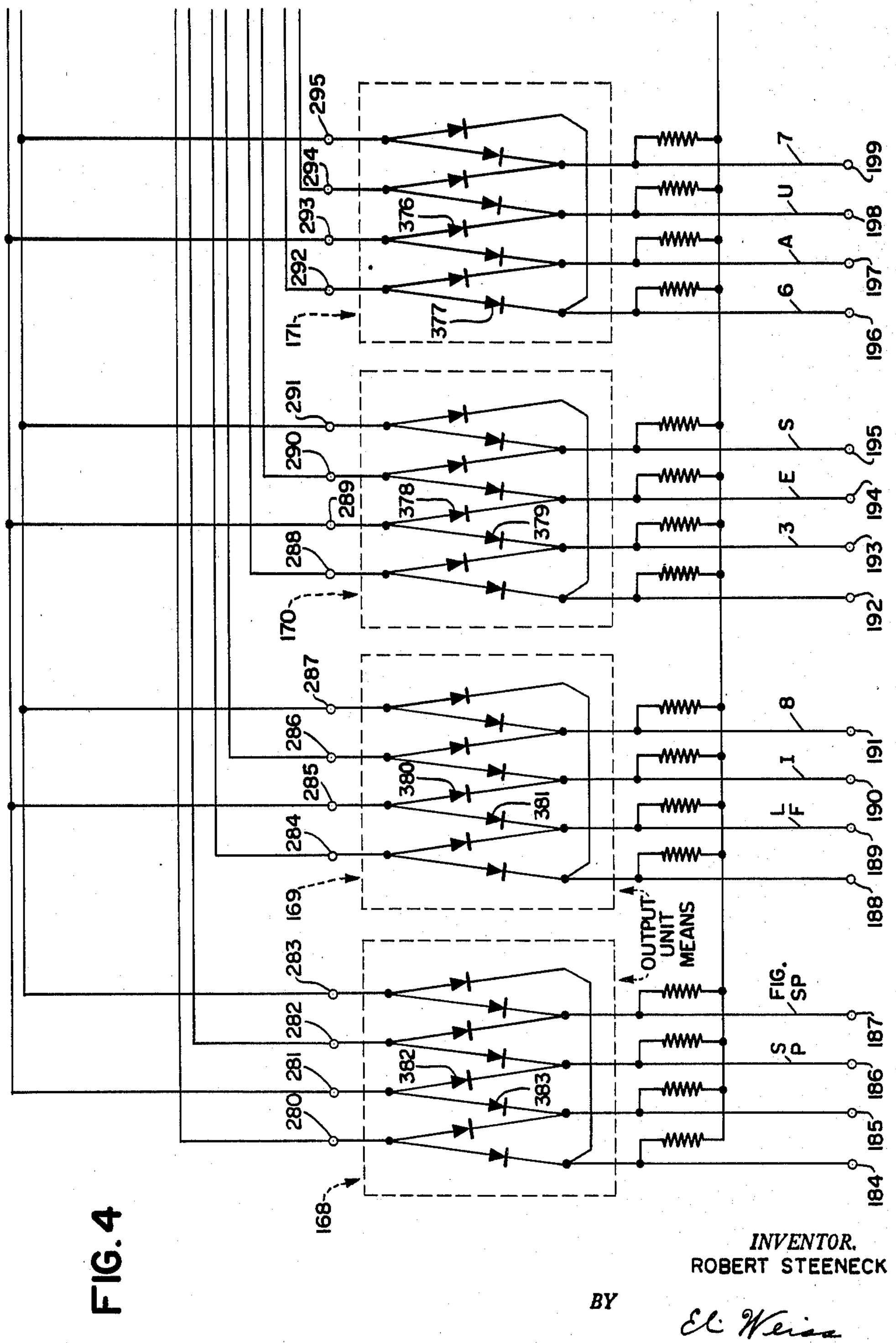
Figure 5:
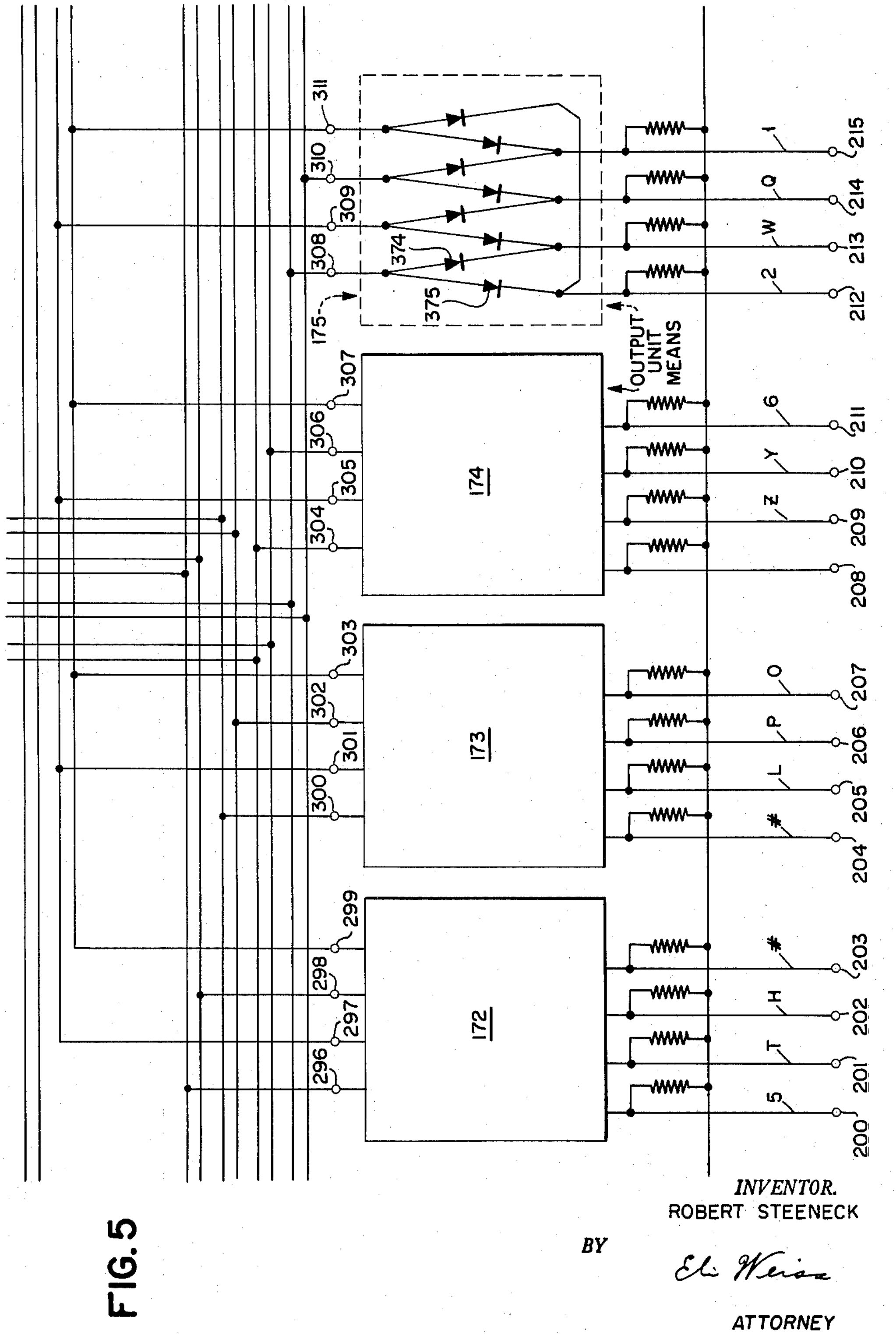
Figure 6:
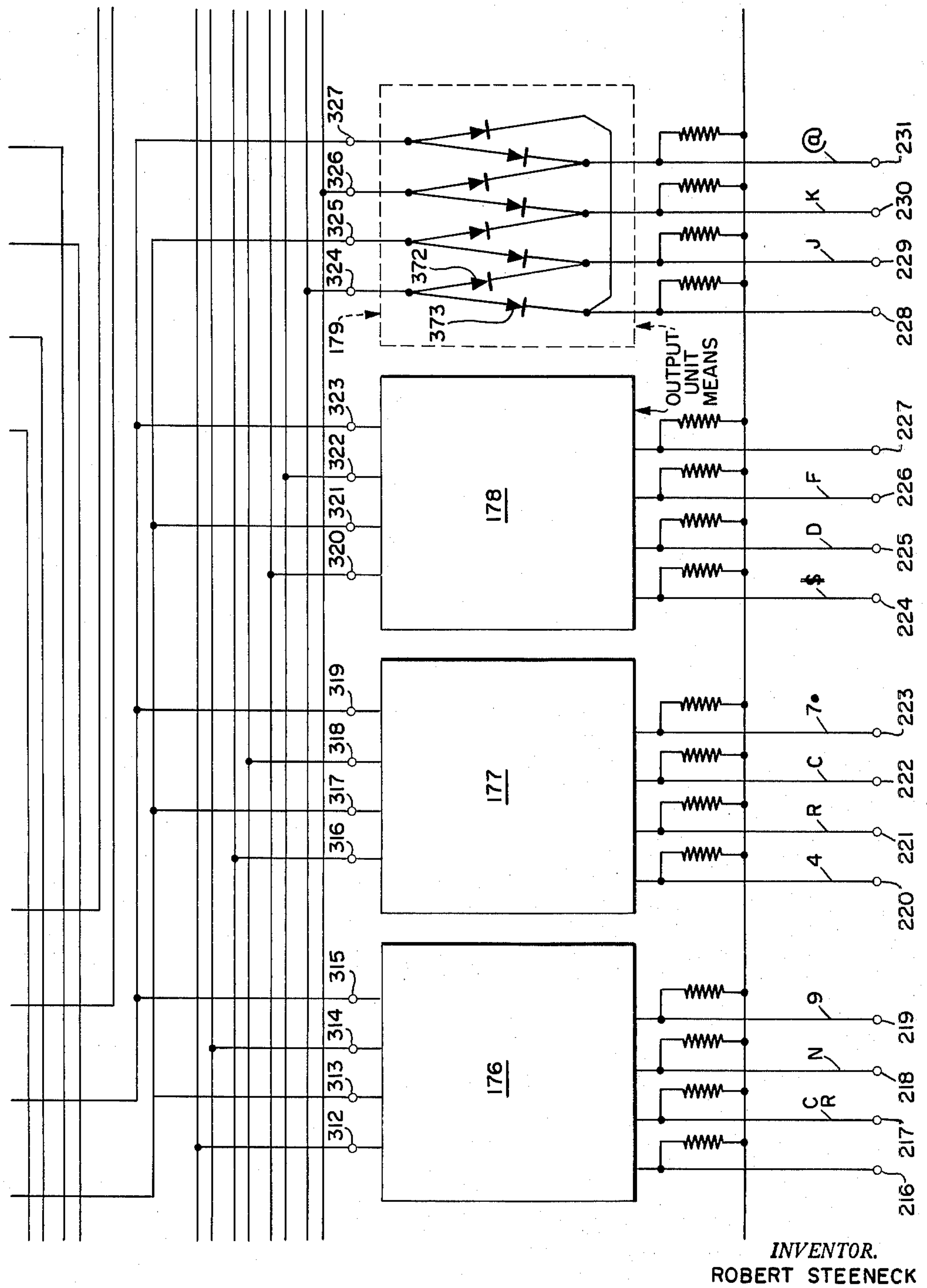
Figure 7:
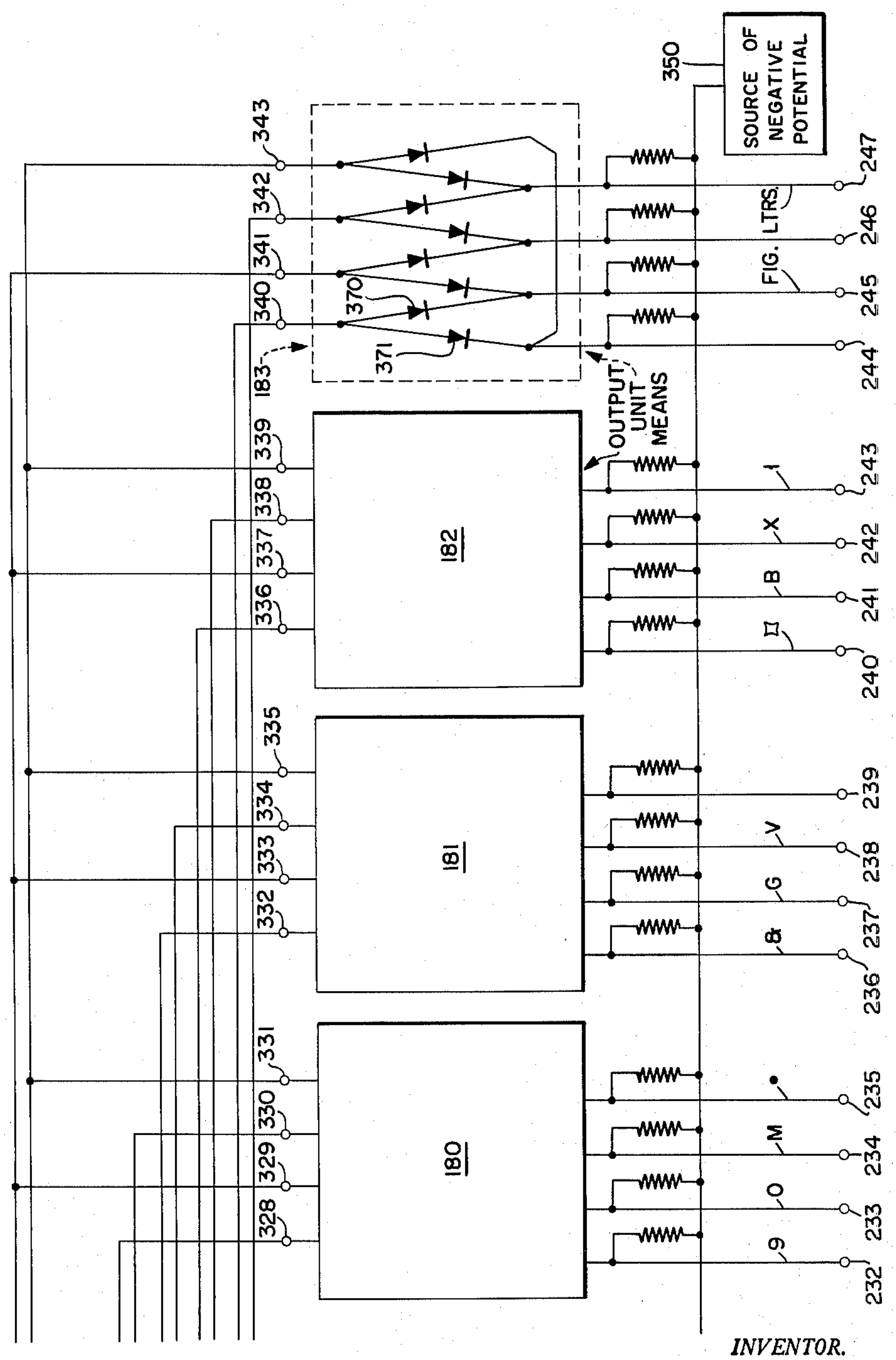

It is also an object of this invention to provide a device which is reliable in operation and economical to build Other objects and many of the attendant advantages of this invention will be readily appreciated as the apparatus becomes better understood by reference to the following detailed description when considered in connection with the accompanying drawings wherein:

FIG. 1 is a schematic diagram of structure in accordance with the principles of this invention;

FIGS. 2 through 7 when arranged relative to each other as indicated in FIG. 8 shows a schematic diagram of structure which can decode received code pulse signals to identify the occurrence of sixty-four distinctive symbols.

Briefly, in this invention a plurality of unidirectional conductive devices such as diodes or the like are interposed between input terminals and output terminals to provide a unit. A single unit, or the assemblage of three or more units, the number of units being determined by the number of distinctive symbols that must be identified comprises the mixing module matrix for decoding received code pulse signals. To provide a universal type of building block and to permit the rapid detection and correction of electrical failures which may occur in an assembled matrix each unit is constructed as a plug-in assemblage.

With particular reference to the unit—the plug-in assemblage—unidirectional conductive means such as diodes are coupled together in series fashion to form a continuous loop. Now, if it is assumed that the diodes are numbered in consecutive order then the odd numbered diodes are oriented to permit current to flow in a first or clockwise direction around the loop and the even numbered diodes are coupled to permit current to flow in a second or counterclockwise direction around the loop. A tap terminal is present between each of the diodes. If the tap terminals are numbered in consecutive order, then if the odd numbered tap terminals are connected to input terminals, the even numbered tap terminals will be connected to output terminals.

Naturally design requirements may require that these connections be reversed.

Thus, if the loop contains eight diodes there will be four input terminals and four output terminals where a first diode is interposed between the first input terminal and the first output terminal, a second diode is interposed between the first input terminal and the second output terminal; a third diode is interposed between the second input terminal and the second output terminal, a fourth diode is interposed between the second input terminal and the third output terminal; and so on in a similar manner to the eighth diode which is interposed between the fourth input terminal and the first output terminal to complete the loop.

Now, while adjacent diodes are oriented to permit current to flow in opposite directions when the structure of the plug-in unit is considered as a continuous loop—actually the presence of the input and output terminals provides a network where the potential present on an input terminal influences the potential present on two associated output terminals, each of which is also influenced by the potential present on another associated input terminal.

Now, with reference to FIG. 1, there is disclosed a mixing module network composed of three units and capable of receiving a three unit start-stop code pulse signal wherein each pulse signal assumes either a "mark" condition or a "space" condition—each distinctive symbol being represented by a particular combination of mark and space pulse signals.

As used throughout the specification and claims, the terms "mark" and "space" refer to two opposite electrical conditions. In the telegraph art the term "mark" generally refers to a negative battery on a line or a closed line, while "space" customarily refers to a positive battery or open line. In a carrier system these terms will refer to two different modulation frequencies. However, in practice it sometimes occurs that a mark condition will be positive battery while a space will represent negative battery. Therefore, in this specification it is to be understood that the terms "mark" and "space" are used in their broad sense as representing any two different electrical conditions selectively used to transmit intelligence.

However, in the description of the operation of the structure of this invention it will be assumed that a "mark" pulse signal will be a signal having a negative potential and a "space" pulse signal will be a signal having a ground potential.

In FIG. 1 there is illustrated a unit 20 which supports eight unidirectional conductive means such as diodes 21, 24, 27, 30, 33, 36, 39, and 42 each having an anode terminal and a cathode terminal. The anode terminal 23 of diode 21 is coupled to an input terminal 46, and the cathode terminal 22 is coupled to an output terminal 54. The anode terminal 26 of diode 24 is coupled to input terminal 46 and the cathode terminal 25 is coupled to output terminal 56. The anode terminal 29 of diode 27 is coupled to input terminal 48 and the cathode terminal 28 is coupled to output terminal 56. The anode terminal 32 of diode 30 is coupled to input terminal 48 and the cathode terminal 31 is coupled to output terminal 58. The anode terminal 35 of diode 33 is coupled to input terminal 50 and the cathode terminal 34 is coupled to output terminal 58. The anode terminal 38 of diode 36 is coupled to input terminal 50 and the cathode terminal 37 is coupled to output terminal 60. The anode terminal 41 of diode 39 is coupled to input terminal 52 and the cathode terminal 40 is coupled to output terminal 60. The anode terminal 44 of diode 42 is coupled to input terminal 52 and the cathode terminal 43 is coupled to output terminal 54.

Another unit 62 supports the diodes 64, 66, 68, 70, 72, 74, 76, and 78 interposed selectively between input terminals 80, 82, 84, and 86; and output terminals 88, 90, 92, and 94 in the manner similar to that shown and described in detail for the connections of the diodes with the input terminals and the output terminals of unit 20. And, still another unit 96 supports the diodes 98, 100, 102, 104, 106, 108, 110, and 112 interposed selectively between input terminals 114, 116, 118, and 120, and output terminals 122, 124, 126 and 128 in the manner similar to that shown and described in detail for the connections of the diode with the input terminals and output terminals of unit 20.

The input terminals 46, 48, 50 and 52 of unit 20, and the input terminals 116 and 120 of unit 96 are coupled to receive code pulse signals consisting of mark pulse signals and space pulse signals. In accordance with the statement made previously—a "mark" pulse signal is defined as a signal having a negative potential and a "space" pulse signal is defined as a signal having a ground potential.

The input terminals are arranged to operate in pairs each displaying a different potential. However, in this invention, for purposse of explanation it is assumed that a mark signal is represented by a negative potential and a Space signal is represented by a ground potential. Therefore, during operation, a selected one terminal of each pair of terminals will display a ground potential and the other terminals will display a negative potential. Incidently, if a pair of input terminals indicate the occurrence of a mark pulse signal by displaying a negative potential on the first input terminal and a ground potential on the second input terminal of a pair of input terminals, then the pair of input terminals will indicate the occurrence of a space signal by reversing the signal on the terminals—the first input terminal displaying a ground potential and the second input terminal a negative potential. Thus, during operation, one terminal of each pair of input terminals is at ground potential and the other is at a negative potential.

In FIG. 1 the input terminals 46 and 50, and 48 and 52 of unit 20 and input terminal 116 and 120 of unit 96 are the three pairs of input terminals for the network assemblage shown.

Output terminals 54, 56 of unit 20 are connected to input terminals 80, 84 respectively of unit 62; and output terminals 58, 60 of unit 20 are connected to input terminals 114, 118 respectively of unit 96. Input terminals 116, 120 of unit 96 are connected to input terminals 82, 86 respectively of unit 62.

A source of negative potential 146 is coupled to each of the output terminals of units 62 and 96 through a separate impedance. The output terminals 88, 90, 92, 94, 122, 124, 126 and 128 are coupled through resistors 130, 123, 134, 136, 138, 140, 142, and 144 respectively to the source of negative potential 146.

Continuing with FIG. 1, the network shown can decode a received code pulse signal having three mark-space pulse signals. Now, remembering that the input terminals 46, 50; 48, 52; and 116, 120 operate as pairs, with regard to the pair of terminals 46, 50—when a negative signal appears on input terminal 46, a ground signal will appear on input terminal 50; and when a ground signal appears on input terminal 50, a negative signal will appear on input terminal 46. This condition exists for each of the other pairs of input terminals.

Now, in operation, when a mark (negative) pulse signal is present on the input terminals 46, 52, and 120; (ground being present on input terminals 48, 50 and 116) a negative potential will occur on the output terminal 88, and all other output terminals of the units 62, and 96 will be at ground potential. Hereinafter, only those terminals on which a negative potential is present will be indicated, it being understood that the other terminals (those input and output terminals not indicated) will display a ground potential. The presence of a negative potential on input terminals 46, 52, and 116 will cause a negative potential to appear only on output terminal 90; the presence of a negative potential on input terminals 46, 48, 116 will cause a negative potential to appear only on output terminal 92; the presence of a negative potential on input terminals 46, 48, 120 will cause a negative potential to appear only on output terminal 94; the presence of a negative potential on input terminals 50, 48, and 120 will cause a negative potential to appear only on output terminal 122; the presence of a negative potential on input terminals 50, 48, and 116 will cause a negative potential to appear only on output terminal 124; the presence of a negative potential on input terminals 50, 52, and 116 will cause a negative potential to appear only on output terminal 126; and the presence of a negative potential on input terminals 50, 52, and 120 will cause a negative potential to appear only on output terminal 128.

In the description of the operation of the structure of FIG. 1 it shall be assumed that a mark (negative) pulse signal is applied to the input terminals 50, 48, and 120, and that each of the other input terminals displays a ground potential.

This combination of pulse code signals will produce a negative potential signal only on output terminal 122—and the other output terminals 88, 90, 92, 94, 124, 126, and 128 each will display a ground potential.

With particular reference to the unit 96—the presence of a negative potential on each input terminal 114, 116, 118, and 120 will prevent current from flowing through the diodes 98, 100, 102, 104, 106, 108, 110, and 112 from the Source of Negative Potential 146, and each output terminal 122, 124, 126, and 128 will display a negative potential. If, however, one of the input terminals i.e. 118, displays a ground potential instead of a negative potential then the diodes 106 and 108 coupled to that input terminal will pass current to ground from the Source of Negative Potential 146 and the associated output terminals 126, 128 will display a ground potential. It is to be noted that an output terminal will display a ground potential if either one or both of the diodes coupled to it are coupled through their associated input terminals to a ground potential, and that an output terminal will only display a negative potential when both of the diodes coupled to the output terminal are conditioned to prevent the flow of current from the Source of Negative Potential by the presence of a negative potential on each of the input terminals associated with the diodes.

This statement of operation applicable to unit 96 also applies to the units 62 and 20.

In the description of the operation of the structure of FIG. 1 the particular code pulse signals fed to the input terminals is traced through the units 20, 62, and 96 from the input terminals to the output terminals. In this description an output terminal will only display a negative potential when each of the two diodes connected to it are connected to input terminals each of which displays a negative potential. However, the output terminal will display a ground potential when either one or both of the two diodes connected to it are coupled to input terminals each of which displays a ground potential.

This statement of operation is now utilized to accurately and simply explain the operation of this structure, and to illustrate that only one particular output terminal of the matrix is associated with a particular code pulse signal combination.

An involved and cumbersome description would result if the structure of FIG. 1 was illustrated by assuming the presence of a particular code pulse signal at the input terminals and then negative signals were traced through the matrix from the output terminals to the input terminals in a trial and error manner until a concidence occurs. Therefore, in the interest of clarity and consicesness the received code pulse input signals will be traced through the invention from the input terminals to the output terminals. The signals which appear at the output terminals of 20 are as follows: The ground potential present on input terminal 46 establishes a ground potential through diode 21 on output terminal 54 and through diode 24 on output terminal 56. The negative potential present on input terminal 48 operating through diode 30 establishes a negative potential on output terminal 58. However, the negative potential on input terminal 48 attempts to establish a negative potential on output terminal 56 but is prevented from doing so by the ground potential present there from input terminal 46.. Therefore output terminal 56 displays a ground potential. The negative potential present on input terminal 50 establishes a negative potential on output terminal 58 and this negative potential remains on output terminal 58 because of the occurrence of the negative potential on input terminal 48 and the blocking action of diode 27. The ground potential present on the input terminal 52 establishes a ground potential through diode 42 on output terminal 54; and through diode 39 on output terminal 60. However, the presence of the ground potential on output terminal 60 from input terminal 52 prevents the negative potential from input terminal 50 from remaining on output terminal 60, and output terminal 60 displays a ground potential.

Thus, at this time it can be stated that the presence of negative potential signals on the input terminals 48, and 50 and ground potential signals on the input terminals 46, and 52 of unit 20 produces a negative potential signal on the output terminal 58 and ground potential signals on the output terminals 54, 56, and 60 of unit 20.

Continuing, ground potential from terminal 54 acting through diodes 64 and 66 influence terminals 88, and 90 each to display a ground potential; and ground potential from terminal 56 acting through diodes 72, 74 influence terminals 92, 94 each to display a ground potential.

Now, as indicated previously, the input terminal 116 is coupled to a ground potential, and the input terminal 120 is coupled to a negative potential. Therefore, a ground potential from terminal 116 acting through diodes 68, 70 influences terminals 90, 92 each to display a ground potential; and the negative potential from terminal 120 acting through the input terminal 86 of unit 62, and the diodes 76, 78 influences terminals 94, 88 each to assume a negative potential.

However, the ground potential present on input terminal 80 will prevent the negative potential present on input terminal 86 from influencing output terminal 88 and it will display a ground potential. In a similar manner the ground potential present on input terminal 84 will block the effect of the negative potential on input terminal 86 and output terminal 94 will display a ground potential.

In each unit of this invention an output terminal can display a negative potential only if each of its two associated input terminals acting through the related diodes display negative potentials. However, if one of the associated input terminals displays a negative potential and the other input terminal a ground potential then the output terminal will display a ground potential. Obviously, if the two input terminals associated with any one output terminal are at ground potential then the output terminal will also be at ground potential.

With reference now to unit 96, a negative potential is fed from terminal 58 to terminal 114 and influences output terminals 122 and 124 each to display a negative potential. The ground potential fed to terminal 116 influences output terminals 124 and 126 each to display a ground potential. At this instant terminal 124 is influenced by both a negative potential from terminal 114 and a ground potential from terminal 116. However, the ground potential dominates and terminal 124 will display a ground potential. The ground potential fed to terminal 118 from terminal 60 influences output terminals 126 and 128 each to display a ground potential; and the negative potential fed to terminal 120 influences output terminals 128 and 122 each to display a negative potential. Now, similar to terminal 124, terminal 128 is influenced by both a negative potential from terminal 120 and a ground potential from terminal 118. However, the ground potential dominates and influences terminal 128 to display a ground potential. Terminal 126 displays a ground potential through the influence of the ground potential present on each input terminal 116 and 118.

However, each of the two terminals 114 and 120 associated with terminal 122 displays a negative potential and each influences output terminal 122 to display a negative potential.

Thus, in the above illustration wherein a mark or negative pulse signal is fed to each of the input terminals 48, 50, and 120 (the other input terminals being coupled to ground potentials) only the output terminal 122 will display a negative potential—the other output terminals 88, 90, 92, 94, 124, 126, and 128 each will be at ground potential. Other input pulse code signal combinations fed to the input terminals will be identified by noting which output terminal displays the negative potential signal and, since a three unit pulse code signal can provide only eight distinct signal combinations, the structure of FIG. 1 will accurately decode all received information.

Now with reference to FIGS. 2, 3, 4, 5, 6, and 7 assembled as indicated in FIG. 8 there is illustrated a mixing module matrix capable of identifying sixty-four distinctive code combinations from a five unit code pulse signal and a shift pulse signal. The five unit code pulse signal utilized by this invention can be the well known five unit start-stop Baudot type of code, and the sixth or shift pulse signal is utilized to indicate either Letters or Figures.

The mixing module matrix illustrated in FIGS. 2 through 7 contain six pairs of input terminals 150, 151; 152, 153; 154, 155; 156, 157; 158, 159; and 160, 161; twenty-two units 162 through 183 where each unit is similar in design, construction and operation to the unit 20 (or the unit 62 or 96) of FIG. 1; and sixty-four output terminals 184 through 247.

Each unit supports eight diodes, four input terminals and four output terminals. The diodes are coupled in series and the last occurring diode is coupled to the first occurring diode to form a continuous loop or circle having eight diodes. The first, third, fifth, and seventh—the odd numbered occurring diodes are oriented to permit current to flow around the continuous loop in a first direction, and the second, fourth, sixth, and eighth—the even numbered occurring diodes are oriented to permit current to flow around the continuous loop in a second direction. The continuous loop of eight diodes supports eight terminals—four input terminals and four output terminals. An input terminal is coupled to the continuous loop at a point immediately prior to the occurrence of the first, third, fifth and seventh diodes; and an output terminal is coupled to the continuous loop at a point immediately prior to the occurrence of the second, fourth, sixth, and eighth diodes.

Unit 164 supports four input terminals 150, 152, 151, and 153; four output terminals 400, 401, 402, and 403; and eight diodes.

Unit 163 supports four input terminals 156, 158, 157, and 159, four output terminals 250, 251, 252, and 253 and eight diodes.

Unit 164 supports four input terminals 404, 405, 406, and 407; four output terminals 408, 409, 410, and 411; and eight diodes.

Unit 165 supports four input terminals 254, 154, 255, and 155; four output terminals 256, 257, 258, and 259; and eight diodes.

Unit 166 supports four input terminals 260, 261, 262, and 263; four output terminals 264, 265, 266, and 267; and eight diodes.

Unit 167 supports four input terminals 268, 160, 269, and 161; four output terminals 270, 271, 272, and 273; and eight diodes.

The mixing module matrix illustrated in FIGS. 2 through 7 contains six pairs of input terminals 150, 151, and 152, 153 coupled to unit 162; 154, 155 coupled to unit 164 and 165; 156, 157 and 158, 159 coupled to unit 156; and 160, 166 and 161 coupled to unit 167.

The output terminals 400, 401, 402, and 403 of unit 164 are coupled to the input terminals 404, 406 of unit 165 and 255, 254 of unit 164 respectively. Input terminals 154, 155 of unit 165 are coupled to input terminals 405, 407 of unit 164 respectively.

The output terminals 250, 251, 252, and 253 of unit 163 are coupled to input terminals 260, 262 of unit 166 and 269, 268 of unit 167 respectively. Input terminals 160, 161 of unit 167 are coupled to input terminals 261, 263 of unit 166 respectively.

In unit 167, output terminal 273 is coupled to the input terminal 309 of unit 175, 305 of unit 174, 301 of unit 173, and 297 of unit 172. Output terminal 272 is coupled to input terminals 311 of unit 175, 307 of unit 174, 303 of unit 173, and 249 of unit 172. Output terminal 271 is coupled to input terminals 295 of unit 171, 291 of unit 170, 287 of unit 169, and 283 of unit 168. Output terminal 270 is coupled to input terminals 293 of unit 171, 289 of unit 170, 285 of unit 169, and 281 of unit 168.

In unit 166 output terminal 267 is coupled to input terminal 341 of unit 183, 337 of unit 182, 333 of unit 181, and 329 of unit 180. Output terminal 266 is coupled to input terminals 343 of unit 183, 339 of unit 182, 335 of unit 181, and 331 of unit 180. Output terminal 265 is coupled to input terminals 327 of unit 179, 323 of unit 178, 319 of unit 177, and 315 of unit 176. Output terminal 264 is coupled to input terminals 325 of unit 179, 321 of unit 178, 317 of unit 177, and 313 of unit 176.

In unit 165 output terminal 259 is coupled to input terminals 284 of unit 169, 300 of unit 173, 316 of unit 177, and 332 of unit 181. Output terminal 258 is coupled to input terminals 286 of unit 169, 302 of unit 173, 318 of unit 177, and 334 of unit 181. Output terminal 257 is coupled to input terminals 282 of unit 186, 298 of unit 172, 314 of unit 176, and 330 of unit 180. Output terminal 256 is coupled to input terminals 280 of unit 168, 296 of unit 172, 312 of unit 176, and 328 of unit 180.

In unit 164 output terminal 195 is coupled to input terminals 292 of unit 171, 308 of unit 175, 324 of unit 179, and 340 of unit 183. Output terminal 194 is coupled to input terminals 294 of unit 171, 310 of unit 175, 326 of unit 179, and 342 of unit 183. Output terminal 193 is coupled to input terminals 290 of unit 170, 306 of unit 174, 322 of unit 178, and 338 of unit 182. Output terminal 192 is coupled to input terminals 288 of unit 170, 304 of unit 174, 320 of unit 178, and 336 of unit 182.

The unit 168 supports the output terminals 184 through 187; unit 169 supports the output terminals 188 through 191; unit 170 supports the output terminals 192 through 195; unit 171 supports the output terminals 196 through 199; unit 172 supports the output terminals 200 through 203; unit 173 supports the output terminals 204 through 207; unit 174 supports the output terminals 208 through 211; unit 175 supports the output terminals 212 through 215; unit 176 supports the output terminals 216 through 219; unit 177 supports the output terminals 220 through 223; unit 178 supports the output terminals 224 through 227; unit 179 supports the output terminals 228 through 231; unit 180 supports the output terminals 232 through 235; unit 181 supports the output terminals 236 through 239; unit 182 supports the output terminals 240 through 243; unit 183 supports the output terminals 244 through 247. Each of the output terminals 184 through 247 is coupled to a source of negative potential 350 through a resistor.

The structure disclosed in FIGS. 2 through 7 is a mixing module matrix or network composed of twenty two similar units each of which can be assembled and packaged as a plug-in unit. This matrix assemblage is capable of decoding a five unit start-stop code pulse signal wherein each pulse signal assumes either a "mark" condition of a "space" condition—the particular combination of mark and space pulse signals being utilized to indicate each distinctive symbol. Furthermore, this disclosed assemblage is sensitive to the receipt of a shift pulse signal—a signal which permits the identification of additional symbols and is most commonly used to indicate the occurrence of "letters" symbols or "Figures" symbols.

In the operation of the structure of FIGS. 2 through 7 as in the operation of the structure of FIG. 1, the input terminals are arranged to operate in pairs where each terminal of a pair of terminals displays a different potential. It is assumed for purposes of explanation that a Mark signal represents a negative potential and a space signal represents a ground potential. Therefore to indicate the occurrence of a Mark signal the first (left) occurring input terminal of a pair of terminals will display a negative potential and the second (right) occurring input terminal of the pair of terminals will display a ground potential—the occurrence of a space signal is indicated by reversing the signals on the terminals—the first input terminal displaying a ground potential and the second input terminal displaying a negative potential.

The shift signal also consists of mark and space signals—one indicating "letters" and the other indicating "Figures," the presence of a negative signal on one terminal and a ground signal on the other terminal indicating one condition and a reversing of potentials indicating the other condition.

To facilitate the explanation of the operation of the structure of FIGS. 2–7, the letter "A" as represented in the well known five unit start-stop Baudot type code (also referred to as Teletype code) will be fed to the input terminals. The letters "A" is composed of a two Mark pulses followed by three Space pulses. Therefore, in the first pair of input terminals, the terminal 150 will be at negative potential and terminal 151 will be at ground potential; and in the second pair of input terminals, terminal 152 will be at negative potential and terminal 153 will be at ground potential. This arrangement of potentials represents Mark signals on the first and second pair of input terminals. Now, the remaining three pairs of input terminals must represent Space signals. Thus, the potentials are reversed—the first appearing terminal of each pair of terminals being at ground potential and the second appearing terminal of each pair of terminals being at negative potential. Therefore, in the third pair of input terminals—terminal 154 is at ground potential and terminal 155 is at negative potential. In the fourth pair of input terminals—terminal 156 is at ground potential and terminal 157 is at negative potential. In the fifth pair of input terminals—terminal 158 is at ground potential and terminal 159 is at negative potential. The last pair or set of input terminals 160, 161 is coupled to receive the shift pulse signal, the signal which indicates the occurrence of either "Letters" or "Figures." But, since the symbol "A" is a "Letter" and not a "Figure" the signal on the terminal 160 is a ground potential and the signal on the terminal 161 is a negative potential. If the symbol "A" were a "Figure" such as "7" rather than a "Letter" these potentials would be reversed.

In the description of the operation of the structure of FIGS. 2 through 7 a particular code pulse signal (the letter A) fed to the input terminals is traced through the twenty two units 162 through 183 from the input terminals to the output terminals. In this description it can be stated that for all practical purposes (as was done for the structure of FIG. 2) an output terminal of a unit will display a negative potential and each of the two diodes connected to it are connected to input terminals each of which displays a negative potential. However, the output terminal will display a ground potential when either one or both of the two diodes connected to it are coupled to input terminals each of which displays a ground potential.

This statement of operation is now utilized to accurately and simply explain the orepation of this structure from input terminals to output terminals and to illustrate that only one particular output terminal of the matrix will display a negative potential for each particular code pulse signal combination.

In the description which follows only those terminals which display a negative potential will be indicated, all other terminals (those not referred to) both input and output will display ground potentials.

The negative potentials fed to input terminals 150, 152 of unit 162 produce a negative potential on output terminal 401 which is fed to input terminal 406 of unit 164. The negative potential from input terminal 155 is fed to input terminal 407 of unit 164. The occurrence of a negative potential on input terminals 406, 407 produces a negative potential on output terminal 411 which is fed to the input terminals 292 of unit 171, 308 of unit 175, 324 of unit 179, and 340 of unit 183.

Now, with reference to units 163, 166, and 167, the negative potentials on input terminals 157, 159 produce a negative potential on output terminal 253 which is fed to input terminal 268. This negative potential on input terminal 268 in combination with the negative potential from the terminal 161 (shift pulse terminal) produces a negative potential on output terminal 270 which is fed to input terminals 293 of unit 171, 289 of unit 170, 285 of unit 169, and 281 of unit 168.

The negative potential signal on input terminal 292 in unit 171 combines with the negative potential on input terminal 293 to cause a negative potential to appear on output terminal 197. All other output terminals display a ground potential. Each output terminal of units 168 through 183 represents a different symbol (FIG. and letters). These symbols are indicated in FIGS. 4, 5, 6, and 7 for the standard five unit code.

A careful examination of the structure of FIGS. 2 through 7 will disclose that when the Letter A is decoded—there are only twenty six diodes acting to block the flow of current. Thus, there are only twenty six possible electrical leakage paths, a very small number in view of the number of diodes utilized. These diodes which provide a minimum of leakage paths for the letter A are as follows: diodes 370 and 371 in unit 183; 372 and 373 in unit 179; 374 and 375 in unit 175; 376 and 377 in unit 171; 378 and 379 in unit 170; 380 and 381 in unit 169; 382 and 383 in unit 168; 384 and 385 in unit 167; 386 and 387 in unit 166; 388 and 389 in unit 165; 390 and 391 in unit 164; 392 and 393 in unit 163; and 394 and 395 in unit 162.

Furthermore, since each unit 162 through 183 is identical in design, construction and operation, a single type of plug-in unit can be provided to not only permit rapid removal of defective components by substituting units, but also facilitate the assemblage of networks selectively adaptable to accommodate preselected code pulse signals by providing for a greater or fewer number of units. Obviously many modifications and variations of the present invention are possible in the light of the above teachings. It is therefore to be understood that within the scope of the appended claims in the invention may be practiced otherwise than as specifically described.

What is claimed is:

1. In a mixing module matrix an assemblage comprising a first output unit means; a second output unit means; a third output unit means; a fourth output units means; a fifth output unit means; a sixth output unit means; a seventh output unit means; an eighth output unit means; a ninth output units means; a tenth output unit means; an eleventh output unit means; a twelfth output unit means; a thirteenth output unit means; a fourteenth output unit means; a fifteenth output unit means; a sixteenth output unit means; a first intermediate unit means coupled to feed said third, fourth, seventh, eighth, eleventh, twelfth, fifteenth, and sixteenth output unit means; a second intermediate unit means coupled to said first intermediate unit to receive a common signal and coupled to feed said first, second, fifth, sixth, ninth, tenth, eleventh and twelfth output unit means; a third intermediate unit means coupled to feed said ninth, tenth, eleventh, twelfth, thirteenth, fourteenth, fifteenth, and sixteenth output unit means; a fourth intermediate unit means coupled to said third intermediate unit means to receive a common signal and coupled to feed said first, second, third, fourth, fifth, sixth, seventh, and eighth output unit means; a first input unit means coupled to feed said first and second intermediate unit means; and a second input unit means coupled to feed said third and fourth intermediate unit means, the sixteen output units means, four intermediate unit means and two input units means being twenty-two identical circuit modules.

2. The combination disclosed in claim 1 wherein the circuit module of each of said output unit means, intermediate unit means, and input unit means comprises a first plurality of unidirectional conductive means coupled in series to form a continuous loop each oriented to permit current to flow around said loop in a first direction, a second plurality of undirectional conductive means coupled to occupy alternate positions in said continuous loop with said first plurality of unidirectional conductive means each oriented to permit current to flow around said loop in a second direction, input terminals coupled to said continuous loop in front of each unidirectional conductive means of said second plurality of unidirectional conductive means, and output terminals coupled to said continuous loop behind each unidirectional conductive means of said second plurality of unidirectional conductive means.

3. The combination disclosed in claim 1 wherein the circuit module of each of said output unit means, intermediate unit means, and input unit means comprises a first plurality of diodes coupled in series to form a continuous loop each oriented to permit current to flow around said loop in a first direction, a second plurality of diodes coupled to occupy alternate positions in said continuous loop with said first plurality of diodes each oriented to permit current to flow around said loop in a second direction, and a plurality of terminals interposed between each of said first and second diodes to provide input and output terminals positioned alternately.

4. The combination disclosed in claim 1 wherein the circuit module of each of said output unit means, intermediate unit means, and input unit means comprises a first group of four diodes coupled in series to form a continuous loop each oriented to permit current to flow around said loop in a first direction, a second group of four diodes coupled to occupy alternate positions in said continuous loop with said first group of four diodes each oriented to permit current to flow around said loop in a second direction, input terminals coupled to said continuous loop in front of each diode of said second group of diodes, and output terminals coupled to said continuous loop behind each diode of said second group of diodes.

5. In a circuit matrix, a pyramid of twenty-two identical circuit modules arranged in only three tiers, a first one of said tiers consisting of a first group of two of said circuit modules, a second one of said tiers consisting of a second group of four of said circuit modules, a third one of said tiers consisting of a third group of sixteen of said circuit modules, each of said circuit modules having four input terminals, four output terminals, and four pairs of rectifiers connected respectively between a different one of the input terminals and a different one of the output terminals, so that the three tiers have respectively eight output terminals, sixteen output terminals and sixty four output terminals, means for applying coded input signals to the input terminals of the first group of circuit modules, means connecting the output terminals of one circuit module in the first tier to input terminals of two circuit modules in the second tier, means connecting the output terminals of the other circuit module in the first tier to input terminals of the other two circuit modules in the second tier, means for applying control signals to certain input terminals of the circuit modules in the second tier, and means connecting output terminals of the circuit modules in the second tier to input terminals of the sixteen circuit modules in the third tier, whereby a coded input signal applied to the input terminals of the circuit modules in the first tier appears at any selected one of the sixty-four output terminals of said sixteen circuit modules, and passes through only three rectifiers in traversing circuit modules of the three tiers.

6. In a circuit matrix, a pyramid of twenty-two identical circuit modules arranged in only three tiers, a first one of said tiers consisting of a first group of two of said circuit modules, a second one of said tiers consisting of a second group of four of said circuit modules, a third one of said tiers consisting of a third group of sixteen of said circuit modules, each of said circuit modules having four input terminals, four output terminals, and uni-directional conducting means connecting the input terminals to the output terminals respectively, so that the three tiers have respecively eight output terminals, sixteen output terminals and sixty four output terminals, means for applying coded input signals to the input terminals of the first group of circuit modules, means connecting the output terminals of one circuit module in the first tier to input terminals of two circuit modules in the second tier, means connecting the output terminals of the other circuit module in the first tier to input terminals of the other two circuti modules in the second tier, means for applying control signals to certain input terminals of the circuit modules in the second tier, and means connecting output terminals of the circuit modules in the second tier to input terminals of the sixteen circuit modules in the third tier, whereby a coded input signal applied to the input terminals of the circuit modules in; the first tier appears at any selected one of the sixty-four output terminals of said sixteen circuit modules.

7. In a circuit matrix, a pyramid of circuit modules arranged in only three tiers, a first one of said tiers consisting of a first group of two of said circuit modules, a second one of said tiers consisting of a second group of four of said circuit modules, a third one of said tiers consisting of a third group of sixteen of said circuit modules, each of said modules having four input terminals, four output terminals, and circuit means connecting the input terminals to the output terminals respectively, so that the three tiers have respectively eight output terminals, sixteen output terminals and sixty four output terminals, means for applying coded input signals to the input terminals of the first group of circuit modules, means connecting the output terminals of one circuit module in the first tier to input terminals of two circuit modules in the second tier, means connecting the output terminals of the other circuit module in the first tier to input terminals of the other two circuit modules in the second tier, means for applying control signals to certain input terminals of the circuit modules in the second tier, and means connecting output terminals of the circuit modules in the second tier to input terminals of the sixteen circuit modules in the third tier, whereby a coded input signal applied to the input terminals of the circuit modules in the first tier appears at any selected one of the sixty-four output terminals of said sixteen circuit modules, and passes through only three circuit modules in traversing the tiers.

References Cited by the Examiner

UNITED STATES PATENTS 2,655,625 10/1953 Burton ------------ 340—176

OTHER REFERENCES

Brown, D. R.: Proceedings of the I.R.E., February 1949, pp. 139–147.

NEIL C. READ, *Primary Examiner.*

ROBERT H. ROSE, K. E. JACOBS, H. I. PITTS, *Assistant Examiners.*